Sept. 27, 1938.  O. P. HAEGELE ET AL  2,131,684
WEIGHING APPARATUS
Filed Aug. 7, 1936  11 Sheets-Sheet 1

Fig. 1.

Inventors:
Otto P. Haegele,
Olin H. Basquin,
By Roland C. Rehm Atty.

Sept. 27, 1938.  O. P. HAEGELE ET AL  2,131,684
WEIGHING APPARATUS
Filed Aug. 7, 1936   11 Sheets-Sheet 5

Inventors:-
Otto P. Haegele,
Olin H. Basquin,
By Roland C. Rehm Atty.

Sept. 27, 1938. O. P. HAEGELE ET AL 2,131,684
WEIGHING APPARATUS
Filed Aug. 7, 1936 11 Sheets-Sheet 10

Inventors:—
Otto P. Haegele,
Olin H. Basquin,
By Roland C. Rehm Atty.

Patented Sept. 27, 1938

2,131,684

UNITED STATES PATENT OFFICE 2,131,684

WEIGHING APPARATUS

Otto P. Haegele, Chicago, and Olin H. Basquin, Evanston, Ill., assignors to Streeter-Amet Company, Chicago, Ill., a corporation of Illinois Application August 7, 1936, Serial No. 94,756

14 Claims. (Cl. 265—6)

This invention relates to weighing apparatus and particularly to weighing apparatus having load offsetting mechanism for increasing the capacity of the weight indicating and recording mechanism, and, among other objects, aims to provide improved mechanism for making weight records.

The invention may be readily understood by reference to one illustrative construction embodying the invention and shown in the accompanying drawings.

To multiply the range of the weight indicating or recording devices of scales, it has been the practice to employ means generally in the form of so-called "capacity" or "drop" weights, to counterbalance or offset large units of the weight of the load, the ordinary mechanism counterbalancing and indicating only the weight of that portion of the load in excess of the nearest lower large unit or multiple thereof. For example, in a scale having a capacity of 10,000 pounds and with weight increments of single pounds, a load of say 8,654 pounds would be counterbalanced or offset to the extent of 8,000 pounds by manually set capacity or drop weights representing eight 1,000 pound units, the excess load, namely 654 pounds, being counterbalanced and indicated by the usual scale mechanism, movable poise, pendulum, spring, etc. In scales of this character, the dial (or beam) can be graduated to relatively small units, since its range represents only a small fraction of the maximum capacity of the scale. In usual practice, however, the portion of the load represented by that offset by the capacity weight, must be manually recorded or mentally added to the weight shown on the scale dial or beam. Devices which have been designed automatically to record such capacity weights have been unsuccessful or impractical; nevertheless in many situations it is regarded as essential to provide weighing apparatus having both a large capacity and a small unit weight. If the capacity of the scale substantially exceeds 10,000 pounds, units or increments of 10 pounds are generally regarded as satisfactory.

In the illustrative apparatus, the mechanism for recording the large units in the weight of the load represented by the capacity weights, has been embodied in a form of recording scale similar to that disclosed in our co-pending application Serial No. 69,080; and in this instance the load offset by such capacity weight is advantageously incorporated in a single weight record representing the weight of the entire load. It will be apparent, however, that the invention may be employed in various types of recording scales regardless of the details of the particular recording mechanism.

In the present apparatus, the force of the load on the lever system of the scale is transmitted through steelyard rod 11 to a variable ratio lever or beam 12 by means of which the apparatus may be adapted without redesign or extensive alteration of parts, to a large range of scale multiples. As here shown, the lever 12 is fulcrumed at 13 adjacent one end and transmits the pull of steelyard rod at a predetermined ratio to rod 14. The fitting 15 by which steelyard rod 11 is connected to beam 12 may be shifted along the beam and fixed thereto at such point as will be develop the proper range of tensions in rod 14.

Also connected to beam 12 through rod 16 is a beam 17 fulcrumed at 18 which carries a capacity weight in the form of a slidable weight poise 19 for offsetting large units in the weight of the load as presently described. Beam 17 may also be used if necessary to offset tare or dead loads if provided with another poise which may be adjusted independently of and without interfering with poise 19.

The mechanism for counterbalancing or offsetting that portion of the load in excess of that offset on beam 17, is here represented by a spring 22 connected to rod 14 through a rocking lever 23 which serves to reduce at a fixed ratio, the tension transmitted to spring 22 and correspondingly to multiply, at a fixed ratio, the movement transmitted by rod 14. As here shown, rocker 23 is provided with arcuate rolling surfaces 24 whose axis is at 25, the point of attachment of spring 22. The rocker is supported by a pair of flexible ribbons or tapes 26 which may advantageously be steel tapes of about four thousandths of an inch in thickness, connected at their lower ends to the rocker at the lower extremity 27 of surfaces 24 and at their upper ends 28 to a fixed support 29 having straight rolling surfaces 30 parallel to the axis of rod 14 and spring 22, along which the rocker rolls in the counterbalancing of a given load. Rod 14 is connected to the rocker through a flexible tape 31 similar in character to the tapes 26 which winds on and unwinds from the arcuate surface 32 coaxial with the surfaces 24. The ratio of radii of the surfaces 24 and 32 determines the displacement ratio of the rocking lever 23. The movement of the lever is transmitted to a weight responsive member (whose position represents the weight of the load and is here shown in the form of a dial shaft 33 carrying a rack pinion 34) by a rack rod 35 constrained to travel in a line parallel to the axis of rod 14 and spring 22. Rack 35 is in this instance connected to rocker 23 by tapes 36 and 37 which wind on and unwind from the arcuate extremity 38 of rocker 23 and are respectively connected thereto at points 39 and 40. The arcuate surface 38 also has its axis at 25. The other ends of tapes 36 and 37 are respectively connected at 41 and 42 to the rack rod. Preferably a pair of tapes 36 are used which straddle the single tape 37. They are, of course, connected to lever rack rod in taut condition so as to remove any lost motion or play.

An appropriate dashpot 43 is advantageously connected to the system through rack rod 35 to dampen oscillation and to bring the system quickly to equilibrium.

Rocker 23 should preferably be made of strong and stiff material which does not readily corrode and which may be easily machined. Moreover, it should be preferably light in weight to minimize inertia and should be designed with its center of gravity close to or at the axis 25.

It will be apparent from the foregoing that the displacements of rod 14 are transmitted to dial shaft 33 at a ratio which is constant throughout the range of movement of rod 14. Since the axis 25 of rocker 23 moves in a straight line which is parallel to rod 14 and rack 35 and the spring is designed to elongate according to Hook's law, the movement or position of dial shaft 33 therefore represents and is proportional to the tension in rod 14 and to the weight of that portion of the load which is not offset or counterbalanced on beam 17. The foregoing description of the scale mechanism will suffice for present purposes. It is described in greater detail in our co-pending application.

Dial shaft 33 is provided with the conventional pointer 44, transversing dial 45 whose graduations cover only a single large unit of weight such as 1,000 pounds, 10,000 pounds, etc. In the present instance, the capacity of the scale substantially exceeds 10,000 pounds and the dial is therefore graduated to have a range of 10,000 pounds, the unit weight or increment in this instance being 10 pounds. Loads of 10,000 pounds and above are offset to 10,000 pounds or the nearest lower multiple of 10,000 pounds by a capacity weight 19, as presently described, leaving the excess of the load (less than 10,000 pounds) to be counterbalanced by spring 22 and to be indicated by pointer 14 on the dial.

Figure 2:
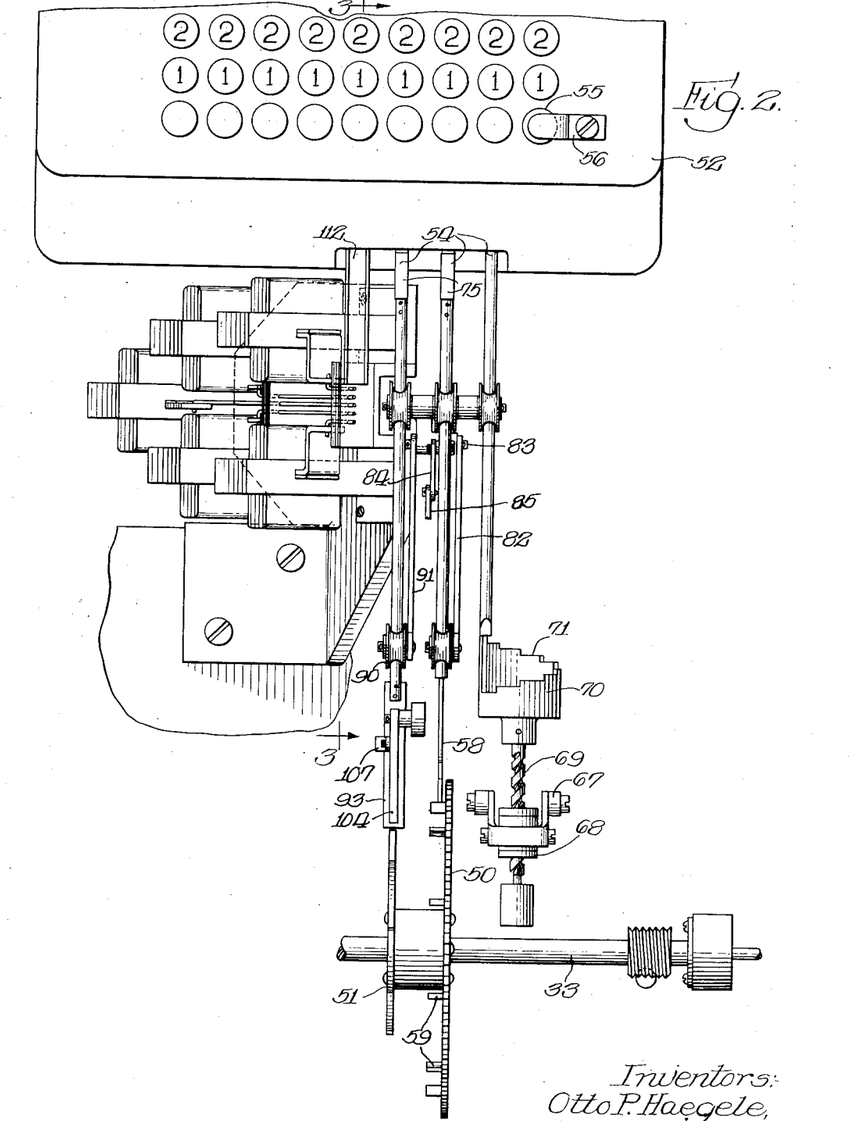
Fig. 2 is a plan view of the recording mechanism taken approximately from the plane 2—2 of Fig. 1.
Figure 6:
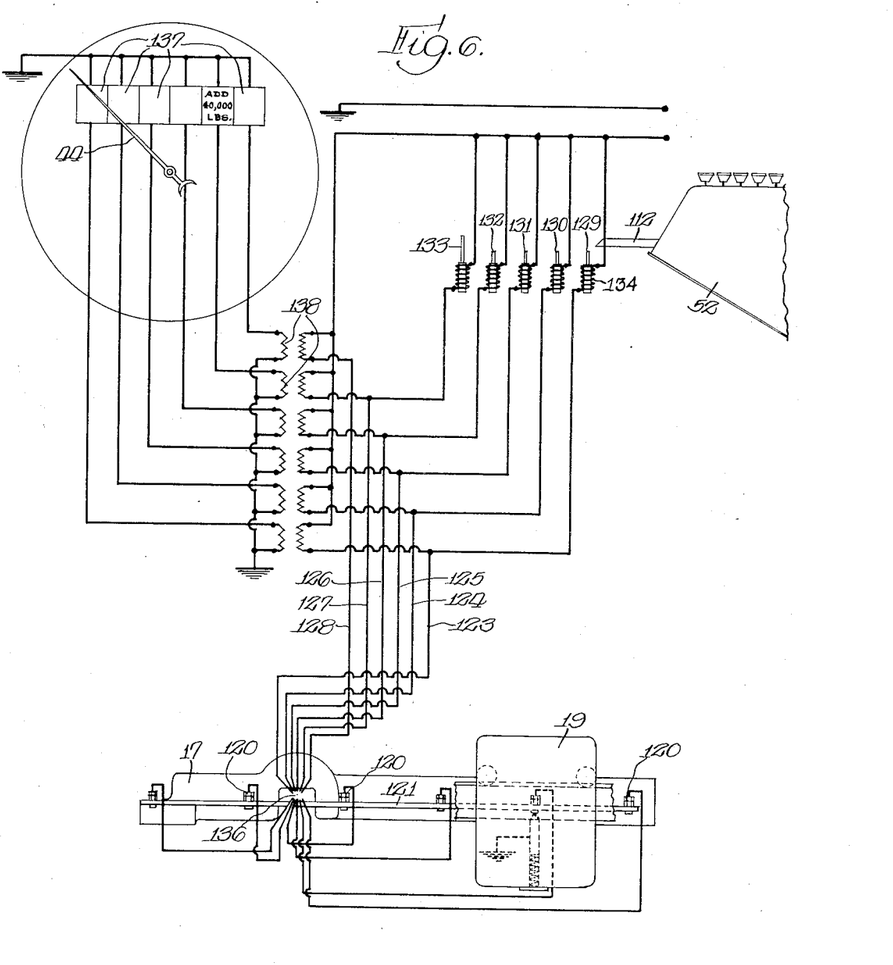
Fig. 6 is a diagrammatic view of the electric circuits for controlling the indicating and recording of the capacity weight.
Figure 7:
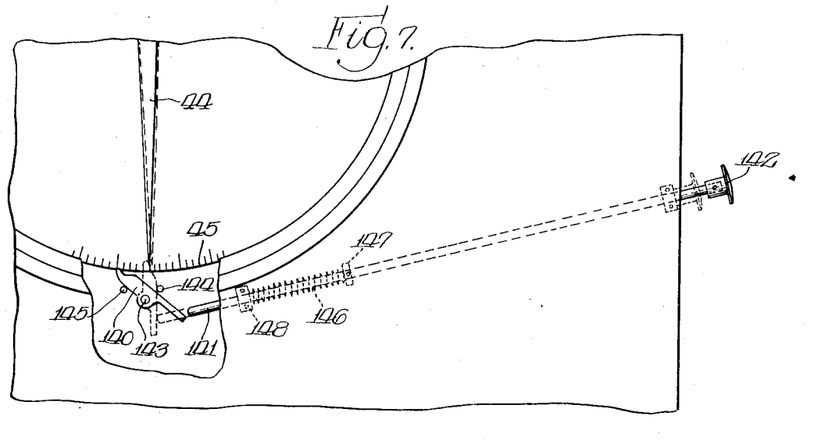
Fig. 7 is an elevation of a device for temporarily setting the dial shaft when totalizing the weight records.
Figure 8:
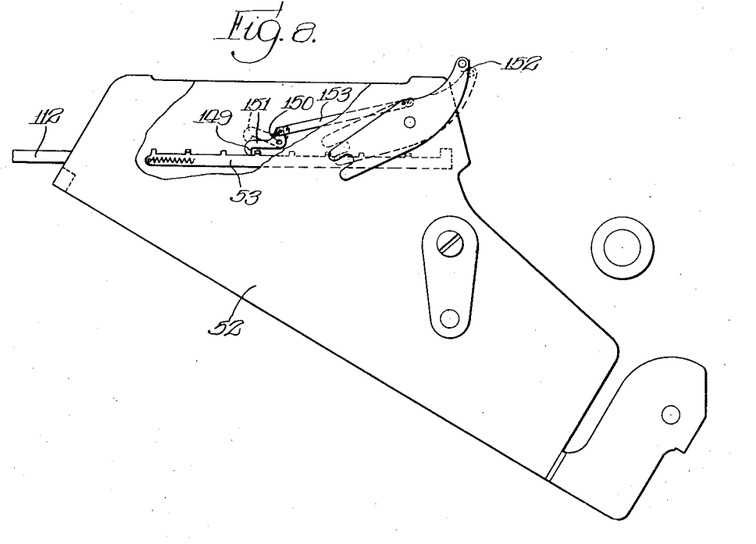
Fig. 8 is an elevation of other mechanism employed during the totalizing operation.

The mechanism here shown for recording the weight of such excess load is represented by a series of step cams 50 and 51 carried on dial shaft 33 and adapted to set printing mechanism here represented by a conventional adding machine 52 which also serves to totalize the printed weights (Figs. 2, 6 and 7). The aforesaid mechanism is fully described and illustrated in said co-pending application and a brief description thereof will suffice for present purposes.

The digit slides 53 of the conventional adding machine are provided with extension fingers 54 attached thereto with sufficient flexibility that lateral play of digit slides 53 need not be communicated to fingers 54. Since the aforesaid excess load contains only three variable digits (thousands, hundreds, and tens—the last digit being "0" since the unit weight is 10 pounds in this instance), three of such fingers 54 are provided, connected respectively to the tens, hundreds and thousands digit slides. The last digit being invariably "0", it is conventionally printed and carried into the adding machine simply by holding down the "0" key 55 in the "ones" bank of the adding machine. For this purpose a holder 56 is simply attached to the adding machine cover in such position to hold down the key.

The digit slides 53 for the "tens", "hundreds", and "thousands" digits are set not by the adding machine keys, but by step cams as presently described. The adding machine keys do not interfere with the aforesaid operation of the recording apparatus so long as they are not depressed. To avoid accidently depressing such keys, this portion of the adding machine is preferably placed inside the housing 57 of the apparatus. If desired, they may be omitted from the adding machine construction; this would require no change in the design.

Figures 9, 10, 11:
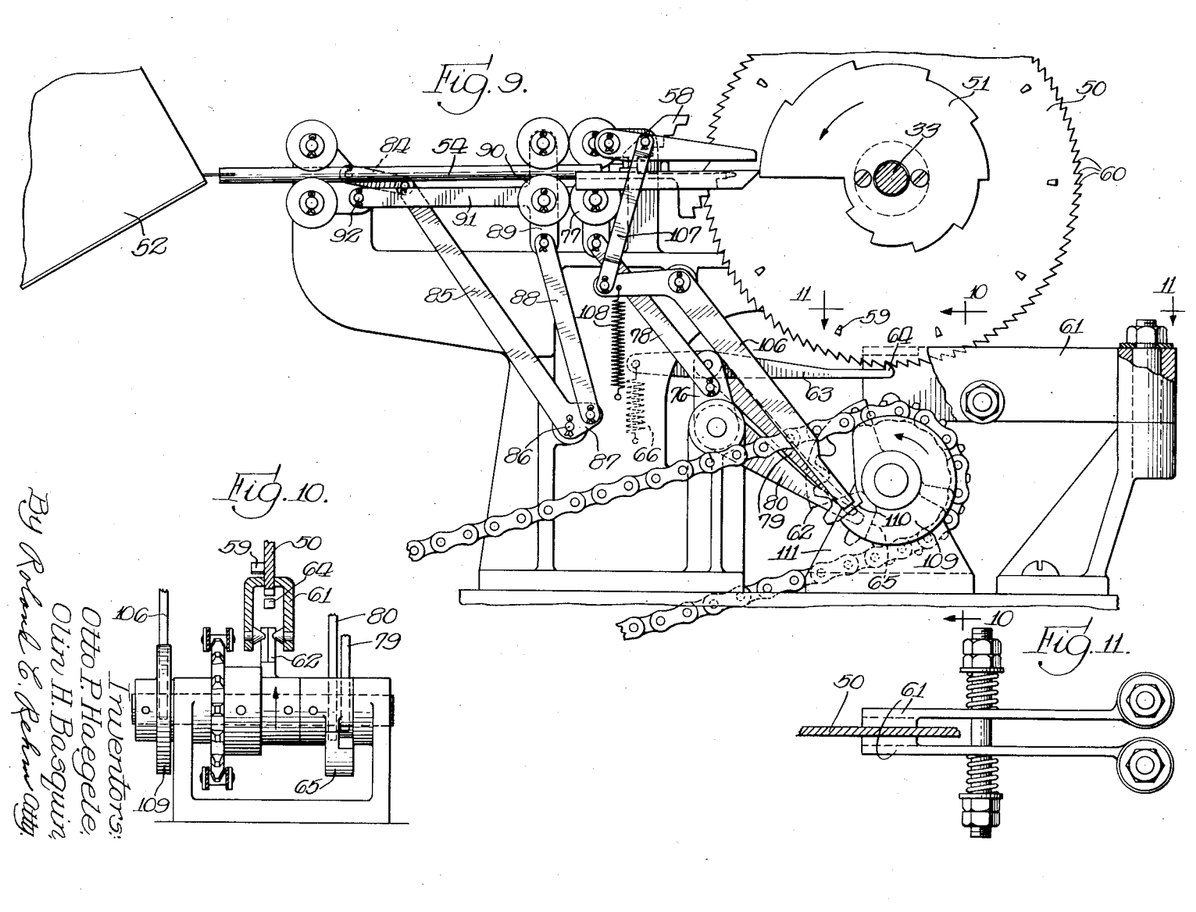
Fig. 9 is an elevation showing the dial shaft, step cams carried thereby, and associated correlating mechanism.
Fig. 10 is a sectional elevation taken on the plane 10—10 of Fig. 9.
Fig. 11 is a plan section taken on the plane 11—11 of Fig. 9.

The "thousands" step cam 51 which comprises 10 steps whose height is determined by the unit movement of the digit slide of the adding machine, is placed opposite or in alignment with the third or "thousands" finger 54 (Figs. 2 and 9). The next or "hundreds" finger 54 is provided with a stepped extremity 58 comprising 10 steps, arranged in two series so as to place the outer or "0" step in alignment with the center line of the finger. The heights of the step risers are determined by the unit movement of the digit slide of the adding machine in relation to the position of the stop or projection 59 to be engaged by a step. The angular distance between projections 59 represents 1,000 pounds, or one-tenth of the dial capacity.

Disk 50 also may advantageously be employed for setting the "tens" or "units" finger 54. To avoid impractical subdivision of disk 50, since a unit of weight represents one one thousandth of the circumference of the disk, supplementary means are employed for multiplying the increments of movement of disk 50 (see Figs. 2, 9, 12 to 14) fully described in our co-pending application. The present description of this mechanism can, therefore, be curtailed.

Figure 12:
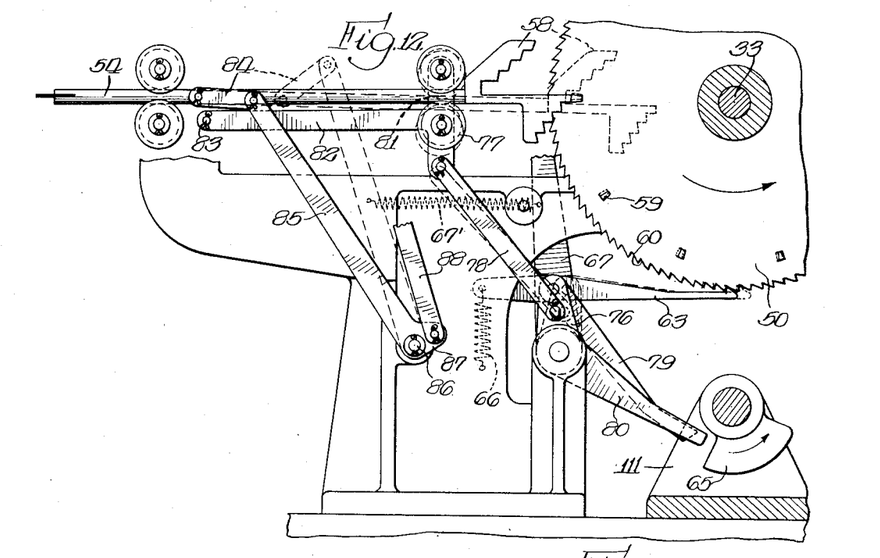
Fig. 12 is another view similar to Fig. 9, illustrating other details of the correlating mechanism.

In this instance disk 50 is provided with a series of 100 steps or teeth 60, each representing 10 units of weight or in this instance 100 pounds. As soon as the scale has come to balance, the disk 50 is clamped by clamping jaws 61 (Fig. 10) controlled by wedging cam 62, the latter normally holding the jaws in separated or released condition but periodically clearing the jaws to allow them to clamp and hold disk 50 in load indicating position during the setting of the recording mechanism. After the disk is locked, pawl 63 having an extremity 64 complementary in shape to the teeth 60, is released. This occurs when cam 65 clears arm 79 which is rigid with pawl 63, allowing spring 66 to move pawl 63 about its pivotal connection with lever 67 into engagement with disk 50. An instant later, cam 65 clears arm 80 (which as shown in Figs. 9, 10 and 12 projects farther than arm 79 and is, therefore, cleared later) thereby releasing lever 67 which until then is held against movement about its axis by arm 80. When thus released lever 67 and pawl 63 are pulled by spring 67' (to the left in Fig. 12) until projection 64 engages and is arrested by a tooth on disk 50.

The degree of movement determines the "unit" or first variable digit in the weight record. In this instance the latter movement is transmitted by pawl 63 through lever 67 to a longitudinally traveling nut 68 operating on a steeply spiral screw 69 carrying the "units" step cam 70 (Fig. 2). The pitch of screw 69 and the range of travel of nut 68 are designed to effect a rotation of step cam 70 through the distance embraced by the series of steps 71 thereon. In the present instance there being 10 units per 100 pounds, step cam 70 is provided with 10 steps distributed throughout the range of rotation of step cam 70, which in this case is one complete revolution. Step cam 70 is positioned in alignment with the "units" finger 54 (Fig. 2).

Figures 13, 14, 15, 16:
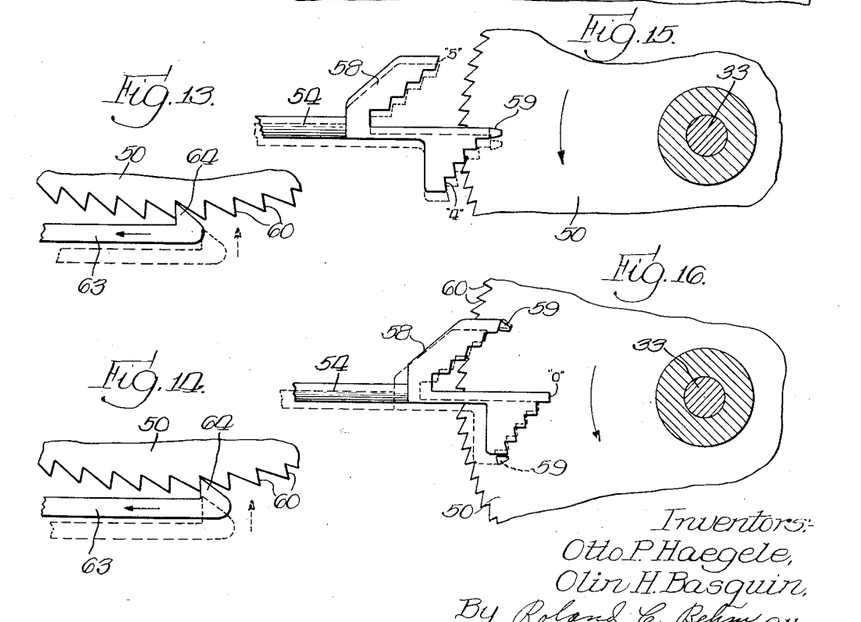
Figs. 13 and 14 are diagrammatic views illustrating the operation of the devices for setting the lowest variable digit of the recorded weight.
Figs. 15 and 16 are diagrammatic views illustrating the operation of the correlating mechanism.

The operation of pawl 63 is illustrated in Figs. 13 and 14, the dotted line position showing the pawl in "waiting" position in relation to disc 50. When released by cam 65, the pawl is moved toward the disc and to the left a distance depending on the initial unmodified relation between a tooth 60 and the extremity 64, which distance determines the setting of cam 70. In Fig. 13, the disc is in a "00" position and the pawl is moved a maximum distance to the left. In Fig. 14, wherein the "waiting" position of extremity 64 is substantially in register with the notch in disc 50, the pawl receives a minimum movement to the left, which corresponds to a "90" setting of step cam 70.

The present apparatus also embodies correlating mechanism similar to that disclosed in said co-pending application, for avoiding errors which may occur at a critical point, i. e., when the digits are in the region of a "0" or "9" position represented by alignment of the step cam finger with either the inside or outside extremity of a step. At such critical points even with precise machine work but without coordinating mechanism, it would occasionally be inevitable that a finger would either improperly engage the next higher step or slip off the corner of the proper step on to the next lower step. In this instance an adjustment is made by shifting the normal relative position of the fingers and their respective step cams at such critical points so as to cause engagement more nearly at the center of the step, or at least sufficiently removed from the edge of the step, to prevent engagement with an improper step.

The "hundreds" and "thousands" fingers 54 are advantageously flexibly connected at 75 to the respective digit slides of the adding machine, thereby making it possible freely to elevate or depress the fingers relative to the adding machine digit slides.

Correlation or adjustment of "hundreds" finger 54 is in this instance effected by vertically shifting the finger guide rolls 77 to determine its relation to disc 50. The extent of vertical adjustment depends on the proximity of the next lower denominational order to "1" or "9". Since the extent of movement of pawl 63 is an index of such proximity, the position of guide rolls 77 are in this case controlled by pawl 63. As here shown the guide roll frame 81 is connected by link 78 to a rock arm 76 offset from lever 67 but coaxial and rotatable therewith. Guide roll frame 81 is here shown supported by an arm 82 pivoted at 83. Maximum elevation of guide rolls 77 (and therefore of "hundreds" finger 54) occurs when pawl 63 and lever 67 have their maximum movement, namely, for a "00" setting of disc 50. A minimum movement of pawl 63 occurs for a "90" setting in which position guide rollers 77 are, in this case, at their lowest point, as determined by the initial or "waiting" position of pawl 63. (See Fig. 14.) Therefore, the degree of elevation of rollers 77 and "hundreds" finger 54 depends upon the proximity of the setting to a "00" position. Illustrative adjustments of "hundreds" finger 54 and its stepped extremity 58 are shown in Figs. 15 and 16. In Fig. 15, the full line position indicates a "000" setting, this being the highest position of the finger as determined by the "00" position of the lower order digits. The dotted line position is that for a "090" setting, being the lowest position of the finger. In Fig. 16, the full line or high position of the extremity 58 represents a setting for "500", the "5" step on the second series of steps being shown in engagement with the succeeding projection 59.

In the dotted line or lowest position (which represents a "490" setting) the "4" step of the first series of steps is shown in engagement with the adjacent projection 59.

Correlation or adjustment of the "thousands" finger 54 is controlled by "hundreds" finger 54, which has its farthest advance for a "9" "hundreds" digit, and its minimum advance for a "0" digit. As here shown (Figs. 9 and 12), "hundreds" finger 54 is connected through link 84 to bell crank lever 85 pivoted at 86. The other arm 87 of the latter is connected by link 88 with the frame 89 carrying guide rolls 90, which frame is shown carried by link 91 pivoted at 92. The extent of advance of "hundreds" finger 54, therefore, determines the vertical adjustment of the guide rolls 90 which direct the "thousands" finger 54.

In Fig. 13 (in full lines) guide rolls 77 are at their maximum elevation, and in this instance the "0" step of the "hundreds" finger is shown in engagement with projection 59. In dotted lines the guide rolls and "hundreds" finger are at their lowest adjusted position, and the projection 59 is shown, in this case, in registry with a "9" step.

In the operation of the present adding machine, the several fingers 54 advance simultaneously at the same controlled speed, each slide or finger continuing its movement until it engages its step cam. In the present design such advance occurs immediately after the barrel step cam 70 has been set (and the guide rollers for the "hundreds" finger have been correspondingly adjusted or correlated) but before any adjustment or correlation for the "thousands" finger has taken place. Auxiliary mechanism is provided to insure the effective operation of the correlating mechanism for the "thousands" finger, notwithstanding the fact that its advance starts before correlation takes place.

Figure 17:
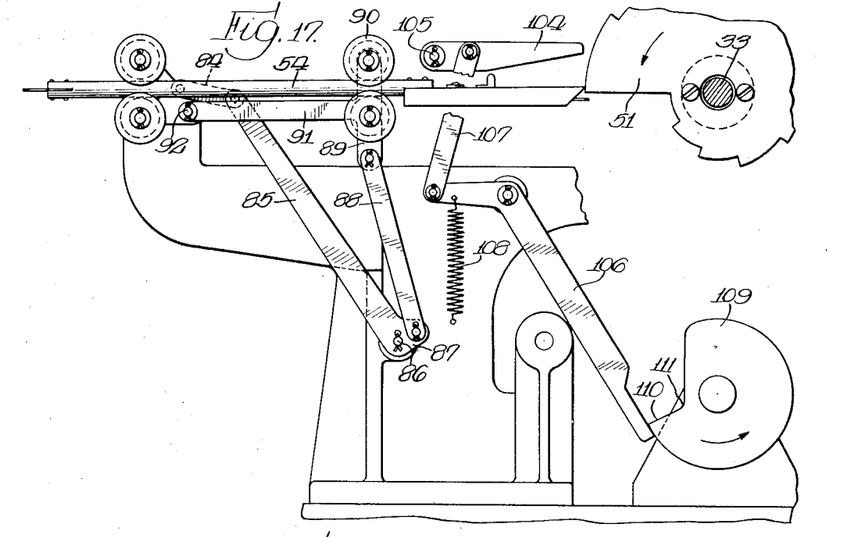
Fig. 17 is a view similar to Fig. 12 illustrating still other elements of the correlating mechanism.

The auxiliary mechanism functions to arrest or check temporarily the advance of a finger, until its correlating mechanism has had opportunity to complete a safe portion of the adjustment for such finger, after which the finger is released, thereby insuring engagement with the proper step of its cam. In the present instance, the "thousands" finger 54 (Figs. 17 to 19) is provided with a stiff, channel-shaped extremity 93 rigidly attached thereto and functioning in all respects as the tip of "thousands" finger 54. The latter is provided with a checking member 94, in this instance projecting slightly beyond the extremity of the finger and adapted to arrest advance of the finger until after correlation or adjustment has been effected. The checking member 94 is here shown pivoted to a stud block 95 projecting through a slot 96 in the finger and longitudinally slidable relative thereto. A weak spring 97 which lies between the extremity of the channel of the finger and the rear face of the block 95, exerts a forward resilient pressure on checking member 94. The rear extemity of member 94 is channel-shaped and its pivot is so arranged relative to block 95 that its oscillation thereon cannot exceed that illustrated in Figs. 18 and 19.

The checking member is normally held in its advanced position, i. e., projecting very slightly beyond extremity 93 (see Fig. 19) by a catch 98 which projects through a slot 99 in extremity 93 and engages shoulder 100 (at the rear end of the slot) to assume the forward thrust of finger 54. Catch 98 is resiliently held in elevated position by flat spring 101 mounted at 102 to the checking member of 94 and carries a projection 103 by which it may be depressed to clear shoulder 100 and to release extremity 93 and permit the finger to advance independently of the checking member 94.

Figure 19:
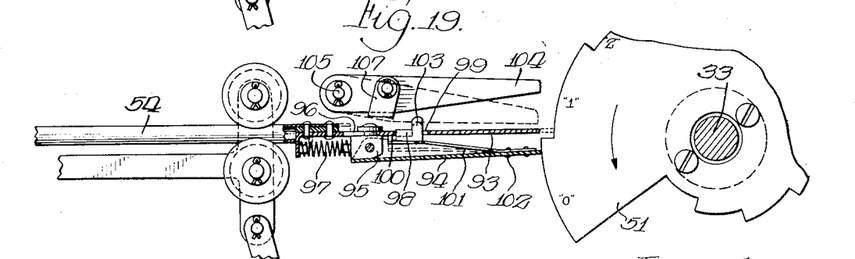
Figure 20:
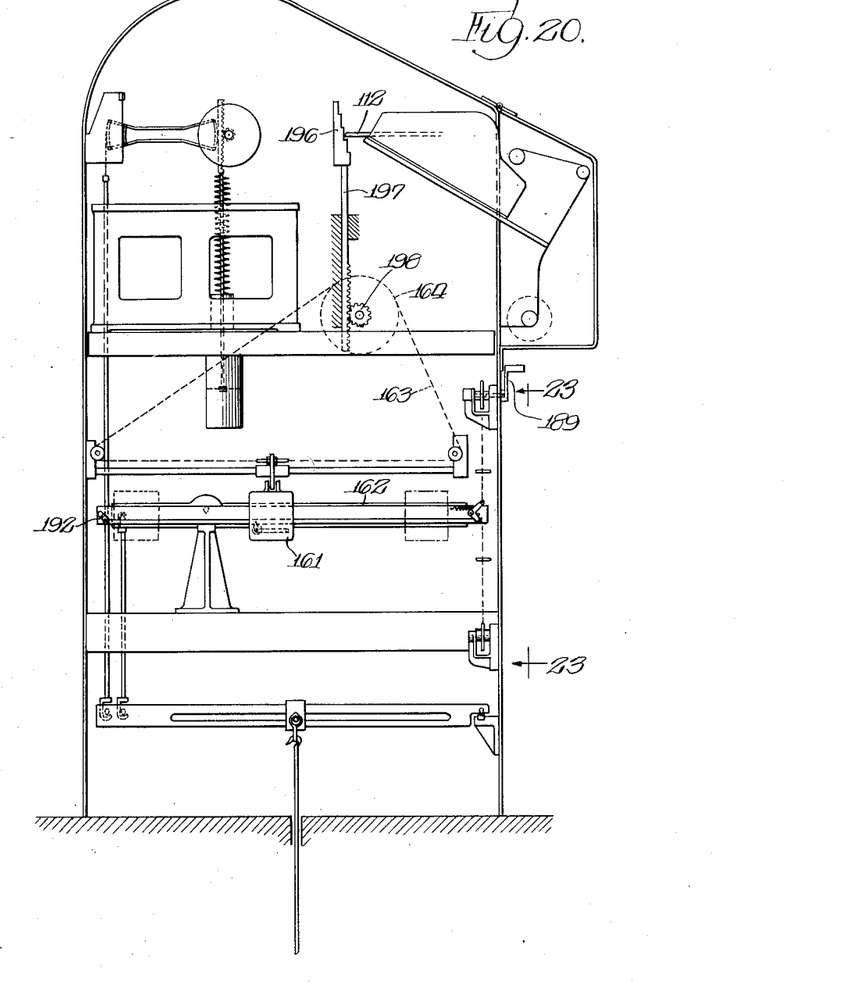
Fig. 20 is an elevation of weighing apparatus wherein the electrical mechanism for signalling and controlling the recording of the capacity weight setting has been substituted by mechanical devices.

As illustrated in Fig. 19, the checking member 94 functions to prevent the advance of extremity 93 into engagement with the "1" or lower step of cam 51, thereby affording an opportunity for a downward adjustment of finger 54 and its extremity 93 which may (depending upon the extent of adjustment determined by the position of the "hundreds" finger) carry the extremity 93 past the step riser into alignment with the "0" or higher step of cam 51. During such downward adjustment, checking member 94 advantageously pivots about its point of engagement with cam 51, thereby avoiding any wearing sliding of either member 94 or extremity 93 over the face of a step.

On the other hand, if the downward adjustment of extremity 93 be insufficient to carry it out of alignment with the lower (in this case the "1") step, a release of checking member 94 will allow the extremity 93 to complete its advance to such lower step.

Figure 18:
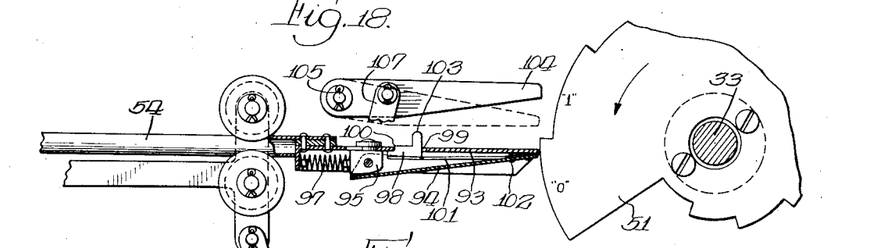
Figs. 18 and 19 are enlarged fragmentary views of checking mechanism.

The controlling mechanism for releasing checking member 94 is here shown in the form of a cam lever 104 pivoted at 105 and controlled by a bell crank lever 106 to which it is connected by link 107. Normally lever 104 is held in the elevated position shown in the full lines (Figs. 18 and 19) against the tension of spring 108 by a cam 109 rotatable with cam 65. Cam 109 is so designed and timed with respect to cam 65 that it releases cam lever 106 only after cam 65 has released lever 80 to effect the aforesaid correlating operation. Thereupon, lever 106 clears the offset 110 on the cam, allowing lever 104 to be pulled down to the fixed lower position shown in dotted lines in Figs. 18 and 19. Such lower position is fixed and predetermined by the portion 111 of cam 109, in which position lever 104 is held until after the completion of the recording operation. Thereupon, it is again elevated to inoperative position by the continued rotation of cam 109. Whether lever 104, in its lowered position, engages and releases catch 98 depends upon the degree of downward adjustment of extremity 93 (as determined by the position of "hundreds" finger 54). If it receive a minor downward adjustment (such as would ensue from a "0", "1", "2", "3", etc. setting of "hundreds" finger 54) lever 104 will depress and release catch 98, allowing extremity 93 to advance into engagement with the next lower step as required by the position of the "hundreds" finger. On the other hand, if "thousands" finger and its extremity 93 receive a major depression (resulting from proximity of the "hundreds" finger to a "9" position), it will have been carried by a safe margin into alignment with the higher step and need not be released. Lever 104 need not, therefore, (and does not in the present case) drop far enough to release catch 98. When the "thousands" finger receives the full resilient thrust of the operating mechanism of the adding machine mechanism (which occurs at the end of the stroke) flat spring 101 will buckle slightly (but only slightly) and allow extremity 93 actually to contact with the step cam, thereby insuring proper alignment of the "thousands" digit in the adding machine, slot 99 being elongated sufficiently for this purpose (Figs. 18 and 19).

The fourth or "10,000" finger 112 of the adding machine is set by means controlled by capacity weight mechanism so that upon the actuation of the adding machine a simultaneous and single weight record is made which represents the total or net weight of the load, the highest digit recording the capacity weight and the lower digits representing the said excess weight indicated on the dial.

Figure 1:
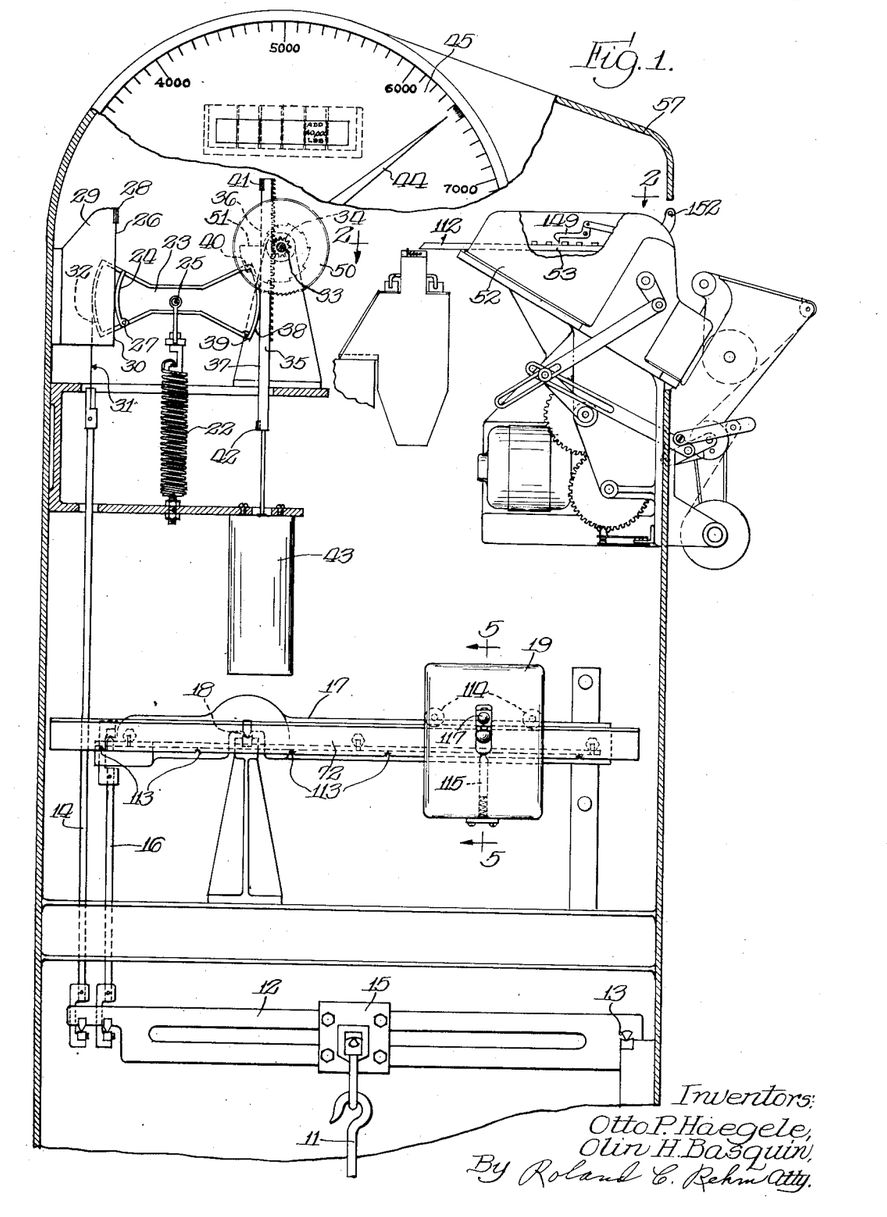
Fig. 1 is a front elevation of the scale mechanism including the system of levers for transferring the pull of the steelyard rod to the weight indicating and recording mechanism, the front of the housing surrounding the apparatus having been broken away to reveal the mechanism on the interior.

In the present instance the capacity weight 19 and beam 17 are designed to offset up to and including 50,000 pounds of load, thus giving the apparatus a total capacity of 59,990 pounds. For a capacity up to 99,990 pounds, it is simply necessary to design beam 17 and capacity weight 19 to offset greater loads. The beam is here shown provided with a bar 72 having five positions represented by notches 113, by which poise 19 may be positioned to offset respectively 00000, 10,000, 20,000, 30,000, 40,000 and 50,000 pounds. In Fig. 1 poise 19 is shown as offsetting 40,000 pounds of the load.

Figures 3, 4, 5:
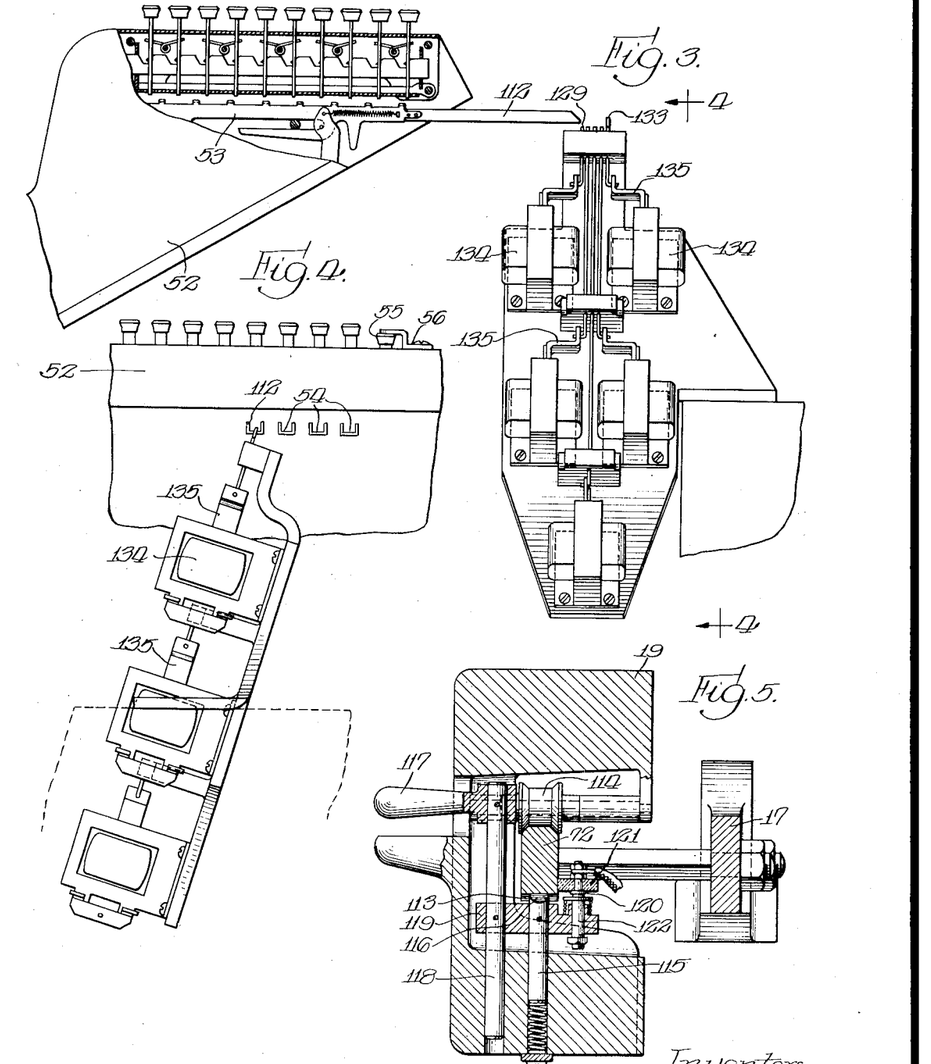
Fig. 3 is an elevation, partly in section, of the recording apparatus and of the mechanism for controlling the recording of the capacity weight setting, taken approximately from the plane 3—3 of Fig. 2.
Fig. 4 is a front elevation of the apparatus disclosed in Fig. 3, taken approximately from the plane 4—4 of Fig. 3.
Fig. 5 is a section through the capacity weight poise and its beam, taken on the plane 5—5 of Fig. 1.

As shown more particularly in Fig. 5, poise 19 is provided with rollers 114 by which it may be moved easily along the beam. A spring pressed plunger 115 having an end 116 shaped to correspond with notches 113 serves to position poise 19 exactly. The plunger is depressed by finger lever 117 carried on rod 118 and connected to plunger 115 by a rigid cross bar 119. Associated with the respective notches 113 are electrical contacts 120 carried by and insulated from bar 72 by an insulating strip 121. Carried on the cross bar 119 is a spring pressed contact plunger 122 which, upon release of finger lever 117 is allowed to approach and engage a contact 120 in alignment therewith. The excess movement necessary to seat plunger 115 squarely and fully in one of the notches, 113 simply depresses contact 122 in the cross bar 119. When lever 117 is depressed to release plunger 115, contact 122 is likewise depressed so that the poise 19 may be moved along the beam without engagement with any adjacent contacts.

Contacts 120 are connected respectively by wires 123, 124, 125, 126, 127 and 128 to mechanism for controlling the setting of finger 112 of the recording apparatus. Such mechanism is here shown in the form of a series of solenoid actuated stops 129, 130, 131, 132 and 133 spaced apart a distance represented by the increments of the movement of the digit slides of the adding machine and serve, when singly energized, to set recorder finger 112 in a position which represents the setting of the capacity weight 19. In the illustration shown (Figs. 3 and 6), the capacity weight is set at 40,000 pounds. This energizes the solenoid to elevate stop 133 and arrest finger 112 in position to register the "4" digit in the 10,000 order, representing 40,000 pounds added capacity weight. The adding machine is correspondingly set by the position of finger 112 to record and print the digit "4" in the fifth place of the weight record. It will be understood that in this printed weight record the second, third and fourth orders of digits are controlled by the setting of the respective fingers 54 and the "ones" digit which is always "0", is set and printed on each operation of the adding machine by the normally depressed "0" key 55 (Fig. 2).

As shown in Figs. 3, 4, and 6, stops 129, 130, etc. are controlled by solenoids 134, certain of whose armature extremities are offset as at 135, which provide a convenient arrangement of solenoids without disturbing the stop spacing which is determined by the adding machine.

In Fig. 6 is illustrated a diagram of the controlling circuits. As there shown, the lines 123, 124, etc. connecting the respective contacts 120 with their solenoids are arranged to converge at the beam pivot so as not to disturb or introduce error into the beam.

The present apparatus is also advantageously provided with means for visually indicating an added capacity weight, if any. In the present instance (see Fig. 6) the dial is provided with a series of indicators 137 controlled by the respective solenoid circuits. The indicator comprises five units in the form of lamps or other signal devices which when energized give a visual signal on the dial showing the load offset by the capacity weight. In Fig. 6, the indicator gives a visual indication of 40,000 pounds, corresponding to the setting of the capacity weight 19. In addition to the record of the load on the scale, the apparatus gives a complete visual indication thereof.

As illustrated in Fig. 6, the visual indicators 137 are connected with the solenoid circuits through small transformers 138 which serve to reduce the voltage in the indicator circuits. The secondary circuits of the transformers are in this case closed through the frame of the apparatus as shown.

The solenoids 134 carry substantially no load and therefore do not overheat if continuously energized.

As soon as the clamping device (Figs. 10 and 11) operates to lock the step cams in their load balance position, the adding machine may be actuated to advance the digit slides and their fingers 54 and 112 until they are respectively arrested by engagement with the setting mechanism. Any appropriate form of adding machine actuating mechanism may be employed. That here illustrated (Fig. 1) is similar to the mechanism described in detail in our said co-pending application.

In totalizing and recording the totals on a series of weight records, the adding machine is actuated in the conventional manner by depressing the totalizing key. To allow free advance of the various digit slides without interference by step cams or other setting devices, the dial shaft is advantageously set temporarily in a sub-zero position, i. e., in position just below the no load or zero position. This will allow the digit slides and their fingers to advance freely, to a "9" position if necessary. One device for temporarily setting the dial shaft in a sub-zero position is illustrated in Fig. 7. As there shown, a pivoted finger 140 is positioned to engage pointer 44 and move it from the zero position (indicated in full lines) to a position slightly under zero (indicated in dotted lines). Normally, the finger remains in inclined position (indicated in full lines) clear of the path of the pointer. Prior to taking a total, the finger is shifted, by spring rod 141 having a handle 142 projecting from the housing of the apparatus, into vertical position (that indicated in dotted lines), in which position it engages and moves the pointer together with the dial shaft and its step cams, to the aforesaid sub-zero position. Finger 140 is eccentrically weighted as illustrated so that when in vertical position, its center of gravity lies to the right of its pivot 143, holding it against stop 144. The counterweight on the finger is, however, so small that if and when a load is placed on the scale, the pressure of pointer 44 is sufficient to tilt the finger to inactive position against its stop 145 where it remains until a total is again taken. The actuation rod 141 is normally pressed outwardly by spring 146 positioned between a collar 147 on the rod and a stationary collar 148. Thus rod 141 will automatically be retracted after its operation, so as not to interfere with the subsequent tilting of the finger to inactive position. In the present case the capacity weight finger 112 is positioned in its highest or outermost position (in this case that for 50,000 pounds) by a fixed stop instead of a solenoid stop, and it is necessary to release such fixed stop when a total is taken. This situation arises only if the final or highest solenoid be supplanted by a fixed stop. Such stop is here represented by a pawl 149 positioned within the adding machine housing to engage the digit slide 53 to which the finger 112 is connected and arrest it in the "5" position if it has not been previously arrested in a lower position by any of the solenoid actuating stops. Pawl 149 is here shown pivoted at 150 so that it can be elevated to position 151 to clear the digit slide in the event a total is to be taken, thereby leaving the digit slide free to advance to any position determined by the total accumulated in the adding machine. The pawl is here shown connected to the totalizer lever 152 by a link 153 thereby insuring the automatic shifting of the pawl to inactive position upon the actuation of the totalizer lever. Upon release of the totalizer lever, the pawl returns to its active position.

As shown in the diagram of Fig. 6, the contact 120 representing the 50,000 pounds' position of the capacity weight is not provided with a solenoid stop but is connected only through a transformer 138 with the appropriate visual indicator 137.

In Figs. 20 to 27 are illustrated mechanisms which may be substituted for the electrical devices shown partly in Figs. 3 to 6. A capacity weight in the form of a poise 161 adapted to travel on beam 162, is remotely controlled by a flexible chain or cable 163 which, though not interfering with the functioning of the poise, is capable of shifting it from one position to another. In the present instance, the chain is operated by a sprocket 164 under the control of an adjusting handle 165 (Fig. 25), which also moves a disc 166 carrying thereon numerals 167 for indicating the setting of the capacity weight. The latter is, in this case, designed to have six positions representing ten thousand pound increments from zero to 50,000 pounds. The handle carries a retractable pin 168 which is adapted to be seated in holes 169 for locating the handle and the capacity weight poise at one of such positions. The poise advantageously carries a bevelled aligning device 170 which may be moved into correspondingly shaped notches 171 in the beam 162 for exactly locating the poise in one of the aforesaid positions. The aligning device is here shown carried on an arm 172 pressed toward the beam by spring 173.

Poise releasing means are represented by a bar 174 which may be moved downwardly to depress roller 175 on arm 172 and thereby to withdraw cam 170 from its notch and release the poise for movement to another position. The poise is provided with rollers 176 to facilitate movement along the beam.

Figure 21:
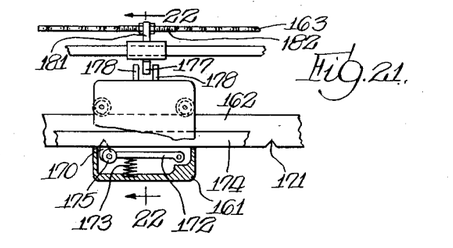
Fig. 21 is an elevation partly in section of a capacity weight poise of the apparatus shown in Fig. 20.
Figure 22:
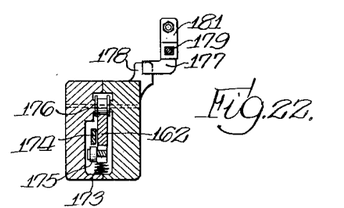
Fig. 22 is a transverse section taken on the plane 22—22 of Fig. 21.

As shown in Figs. 21 and 22, the poise when set may function without interference from the setting mechanism. The latter when in operation, contacts with the poise through a finger 177 projecting between lugs 178 which are spaced apart a distance greater than the thickness of finger 177, thereby providing for clearance sufficient to remove all frictional contact with the poise. Finger 177 is slidably carried upon a guide bar 179 of non-circular section and is provided with a lug 181 for connection with chain 163. The tip of finger 177 is preferably clear of the path of vertical movement of poise 161.

After setting the poise, finger 177 may be moved slightly in the reverse direction to clear the poise, there being sufficient lost motion in the system for this purpose even though the handle 165 be returned to and held in a definite position by the pin 168. An alternative method of clearing the poise after setting by handle 165, is to adjust the setting mechanism to move the poise until the cam device is opposite a notch 171 but not in exact registry with its center. Thereupon the aligning device 170 when released will move the poise slightly in centering it with a notch sufficiently to clear finger 177. Chain 163 is advantageously provided with a screw-threaded section 182 to facilitate fine adjustment of the position of finger 177 thereon.

Figure 23:
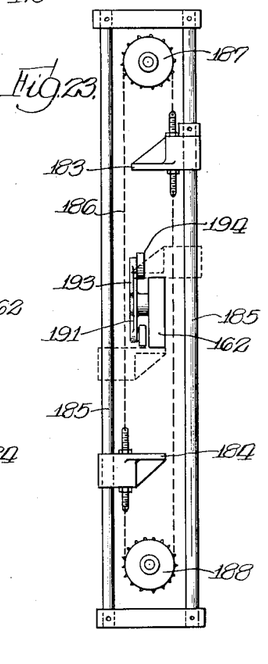
Fig. 23 is an elevation of mechanism for holding the capacity weight beam during the setting of the capacity weight, taken approximately from the plane 23—23 of Fig. 20.
Figure 24:
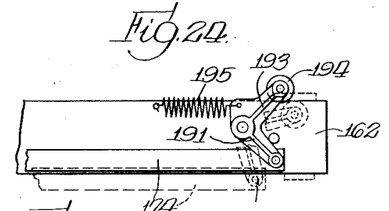
Fig. 24 is an elevation of the end of the capacity weight beam.

In setting the capacity weight poise, the beam is advantageously held stationary in a predetermined position. The mechanism appropriate for this purpose is illustrated partly in Fig. 23 showing a pair of upper and lower jaws 183 and 184 adapted to be closed upon the beam to move it to and hold it in a fixed position. The jaws are vertically slidable on guide bars 185 and are operated by an endless chain 186 which travels around upper and lower sprockets 187 and 188, the former of which, in this case, is connected with an operating crank 189 (see Fig. 20). Prior to adjustment of the capacity weight poise, crank 189 is rotated to close the jaws upon the beam. The upper jaw 183 is advantageously utilized to operate bar 174 which is here shown carried by links 191 and 192 pivoted to beam 162. Link 191 carries a bell crank arm 193 having a roller 194 at its extremity lying in the path of upper jaw 183 and depressed thereby (against the tension of spring 195) to the dotted line position in Fig. 24. Bar 174 is thereby moved to the dotted line position shown in Fig. 24, depressing the poise aligning device 170 to release poise 161. After adjustment of the poise, the jaws are retracted, thereby releasing aligning device 170.

Simultaneously with adjustment of the capacity weight poise a step cam 196 is correspondingly shifted to the capacity weight recording mechanism. The step cam is here shown operated by a rack bar 197 and pinion 198, the latter being fixed to the shaft of the handle 165. Pinion 198, sprocket 164 and the widths of the steps on step cam 196 are designed to shift step cam 196 by amounts corresponding to the setting of poise 161, thereby to set step cam finger 112 and the adding machine to record the load offset by the capacity weight.

Figures 26, 27:
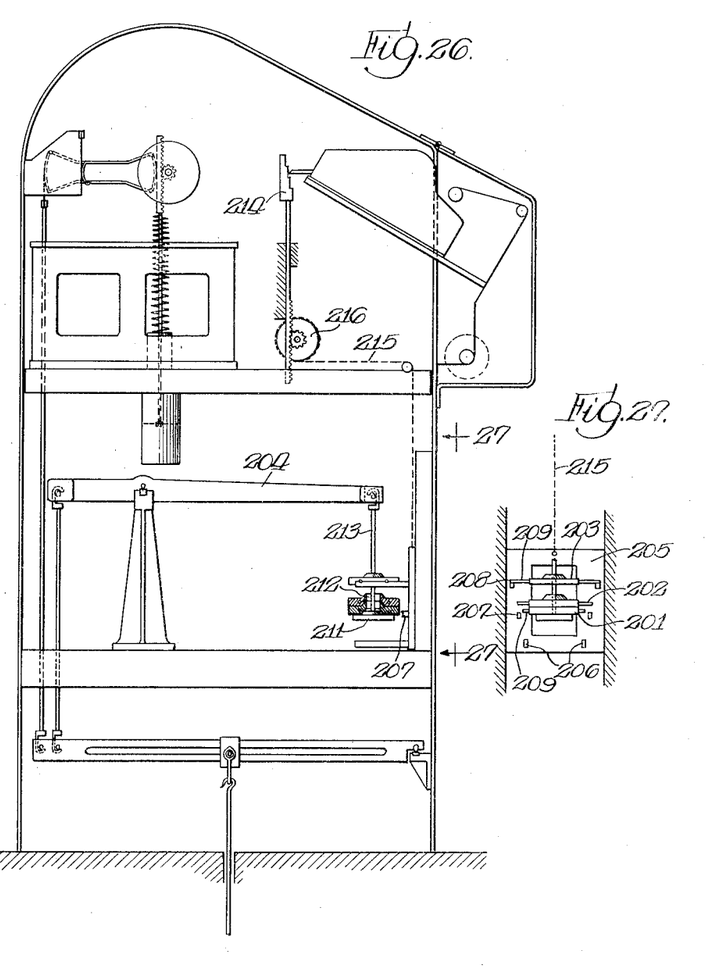
Fig. 26 is an elevation similar to Fig. 20 but showing different mechanical devices for controlling the setting of the capacity weight.
Fig. 27 is an elevation taken approximately from the plane 27—27 of Fig. 26.

In Figs. 26 and 27 is illustrated another form of mechanism for adjusting the capacity weight and recording the load offset thereby. The capacity weight in this instance is represented by a plurality of separate weights 201, 202, 203, the number depending upon the desired variation in the loads offset. In the present instance, three capacity weights are shown providing a range of variation of loads offset from zero to 30,000 pounds in increments of 10,000 pounds. The capacity weights are carried independently of the beam 204 by a vertically movable carrier 205 provided with a series of weight-supporting fingers 206, 207 and 208, spaced increasing distances apart. The respective weights are provided with lateral projections 209 of successively increasing length by which the weights may be engaged and supported independently of the beam by the carrier. The latter may be lowered to place all capacity weights upon the holder 211 suspended from the nose of the beam, or it may be elevated to remove one or more weights in succession. When supported or elevated by the carrier, the weights are quite free from the holder and do not interfere in any degree with the free movement of the beam. The holes 212 through the weights are made substantially larger than the holder rod 213 to allow the latter to swing freely.

Figure 25:
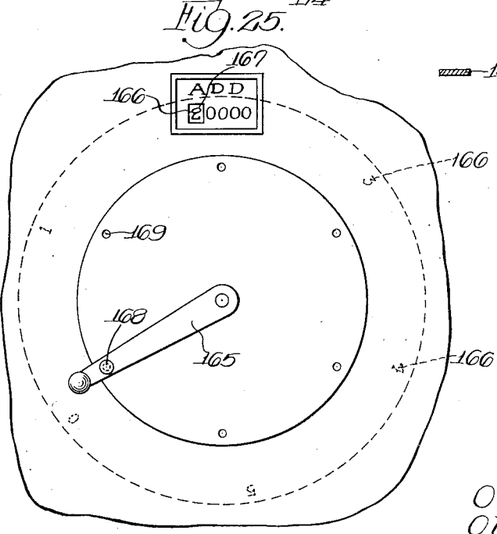
Fig. 25 is an elevation of the device for adjusting the capacity weight, together with a means for indicating the setting of the capacity weight.

The adjustment of the carrier may be controlled by devices similar to those shown in Fig. 25. The setting of the step cam 214 may likewise be similarly controlled. In the present instance the carrier is connected with the adjusting handle and its shaft by a chain 215 which may be wound upon and unwound from sprocket 216.

Obviously the invention is not limited to the details of the illustrated construction since these may be variously modified. Moreover, it is not indispensable that all features of this invention be used conjointly since various features may be used to advantage in different combinations and sub-combinations.

Having described our invention, we claim:

1. The combination comprising weighing apparatus having a range of a single decimal unit, capacity weight mechanism for increasing the capacity of said weighing apparatus and adapted to offset loads comprising whole multiples of said decimal unit, printing mechanism including a plurality of fingers for setting the respective digits in said printing mechanism, a weight responsive member movable to a position representing the weight of the excess of the load over that offset by said capacity weight mechanism, mechanism controlled by said weight responsive member setting the fingers corresponding to the digits in the said excess weight, and electrical circuits controlled by said capacity weight mechanism for setting a stop to position one of said fingers for recording the load offset by said capacity weight mechanism.

2. The combination comprising weighing apparatus having a range of a single decimal unit, capacity weight mechanism for increasing the capacity of said weighing apparatus and adapted to offset loads comprising whole multiples of said decimal unit, an adding machine having a plurality of fingers controlling the several digits in the weight of said load, a weight responsive member movable to a position representing the weight of the excess of the load over that offset by said capacity weight mechanism, mechanism controlled by said weight responsive member setting the fingers corresponding to the denominational orders embraced by said decimal unit weight, and means controlled by said capacity weight mechanism for setting the next higher digit to record the load offset by said capacity weight mechanism.

3. The combination comprising weighing apparatus having a range of a single decimal unit, capacity weight mechanism for increasing the capacity of said weighing apparatus and adapted to offset loads comprising whole multiples of said decimal unit, recording mechanism including a plurality of type bars for printing the several digits in the weight of the load and each having a finger for setting the type bar, a weight responsive member movable to a position representing the weight of the excess of the load over that offset by said capacity weight mechanism, mechanism controlled by said weight responsive member setting the fingers corresponding to the denominational orders embraced by said decimal unit weight, and means controlled by said capacity weight mechanism for setting the next higher digit to record the load offset by said capacity weight mechanism.

4. The combination comprising weighing apparatus having a range of a single decimal unit, capacity weight mechanism for increasing the capacity of said weighing apparatus and adapted to offset loads comprising whole multiples of said decimal unit, printing mechanism including a plurality of fingers for setting the respective digits in said printing mechanism, a weight responsive member movable to a position representing the weight of the excess of the load over that offset by said capacity weight mechanism, mechanism controlled by said weight responsive member setting the fingers corresponding to the digits in the said excess weight, a series of retractible stops for positioning the finger controlling the next higher denominational order to print the digit representing the value of the load offset by the capacity weight mechanism, and solenoids for operating the respective stops and controlled by said capacity weight mechanism to position the stop corresponding to the load offset by said capacity weight mechanism.

5. The combination comprising weighing apparatus having a range of a decimal unit, capacity weight mechanism for increasing the capacity of said weighing apparatus and adapted to offset loads comprising decimal multiples of said decimal unit, a weight responsive member movable to a position representing the weight of the excess of the load over that offset by said capacity weight mechanism, a recording adding machine having relatively closely spaced reciprocable digit slides whose position controls the printing of the digits of the respective denominational orders, projecting devices connected to the respective digit slides and adapted to be advanced by the adding machine with the advance of the digit slides, said load responsive member having setting means for setting the respective digit slides to positions corresponding to the weight of the load in excess of that offset by said capacity weight mechanism, means in said adding machine for advancing said slides and projecting devices into engagement with said setting means to be set thereby, a series of retractible stops spaced corresponding to the increments of movement of the digit slide for controlling the next higher denominational order for positioning the latter slide to cause the printing of a digit representing the weight offset by said capacity weight mechanism, solenoids for operating the respective stops and electric circuits controlled by said capacity weight mechanism for positioning the stop corresponding to the load offset by said capacity weight mechanism.

6. Weighing apparatus of the character described comprising in combination a weight responsive member movable to a position representing the weight of the load, recording mechanism including an adding machine provided with projecting fingers connected to the digit slides of said machine, said weight responsive member having a plurality of step cams for setting certain digits in the weight of the load, means for operating said adding machine to cause said fingers and digit slides to advance into engagement with the respective step cams and for causing said machine to print the digits thus set in the adding machine, and means for shifting said step cams slightly in a reverse direction to a "nine" position so as not to interfere with the free advance of said digit slides and fingers during the operation of said adding machine to record a total.

7. Weighing apparatus of the character described comprising in combination a weight responsive member movable to a position representing the weight of the load, recording mechanism including an adding machine provided with projecting fingers connected to the digit slides of said machine, said weight responsive member having a plurality of step cams for setting certain digits in the weight of the load, means for operating said adding machine to cause said fingers and digit slides to advance into engagement with the respective step cams and for causing said machine to print the digits thus set in the adding machine, means for shifting said step cams slightly in a reverse direction to a "nine" position so as not to interfere with the free advance of said digit slides and fingers during the operation of said adding machine to record a total, and means for automatically releasing said shifting means upon the application of a load.

8. The combination comprising weighing apparatus having a range of a single decimal unit, capacity weight mechanism for increasing the capacity of said weighing apparatus and adapted to offset loads comprising whole multiples of said decimal unit, a conventional recording adding machine having a plurality of digit slides for successive denominational orders whose positions control the printing of the digits in the respective orders, fingers connected with the respective digit slides, a weight responsive member movable to a position representing the weight of the excess of the load over that offset by said capacity weight mechanism, mechanism controlled by said weight responsive member for setting the fingers corresponding to the digits in the said excess weight, and means controlled by said capacity weight mechanism to set the finger controlling the next higher denominational order to a position which represents the weight offset by said capacity weight mechanism.

9. The combination comprising weighing apparatus having a range of a single decimal unit, capacity weight mechanism for increasing the capacity of said weighing apparatus and adapted to offset loads comprising whole multiples of said decimal unit, a conventional adding machine having a plurality of digit slides for successive denominational orders and whose positions control the printing of the digits in the respective orders, a weight responsive member movable to a position representing the weight of the excess of the load over that offset by said capacity weight mechanism, mechanism controlled by said weight responsive member for setting the digit slides corresponding to the denominational orders embraced by said decimal unit weight, and means connected to said capacity weight mechanism for placing a stop in position to set a digit slide of a higher denominational order to record the load offset by said capacity weight mechanism.

10. In weighing apparatus having a range of a decimal unit the combination comprising capacity weight mechanism for increasing the capacity of said weighing apparatus and adapted to offset loads comprising multiples of said decimal unit, a weight responsive member movable to a position representing the weight of the excess of the load over that offset by said capacity weight mechanism, a conventional recording adding machine having relatively closely spaced reciprocable digit slides whose position controls the printing of the digits of the respective denominational orders, projecting devices connected to the respective digit slides and adapted to be advanced by the adding machine with the advance of the digit slides, said load responsive member having setting means for setting the respective digit slides to positions corresponding to the weight of the load in excess of that offset by said capacity weight mechanism, means in said adding machine for advancing said slides and projecting devices into engagement with said setting means to be set thereby, and means controlled by said capacity weight mechanism to serve as a stop for setting the next higher digit to record the load offset by said capacity weight mechanism.

11. The combination comprising weighing apparatus having a range of a single decimal unit, capacity weight mechanism for increasing the capacity of said weighing apparatus and adapted to offset loads comprising whole multiples of said decimal unit, a load responsive member movable to a position representing the weight of the excess of the load over that offset by said capacity weight mechanism, printing mechanism for printing adjacent alined numerals representing the weight of the load, mechanism controlled by said load responsive member for setting numerals of lower denominational orders in said mechanism to print said excess load, and means controlled by said capacity weight mechanism for setting the numeral in the next higher denominational order of said printing mechanism to print the load offset by said capacity weight mechanism, thereby recording the weight of the entire load by a single number comprising a series of adjacent alined numerals.

12. The combination comprising weighing apparatus having a range of a single decimal unit, capacity weight mechanism for increasing the capacity of said weighing apparatus and adapted to offset loads comprising whole multiples of said decimal unit, printing mechanism for printing the weight of the load by a number comprising a series of numerals including a plurality of fingers for setting the respective digits in said printing mechanism for printing the aforesaid number, a weight responsive member movable by the load itself to a position representing the weight of the excess of the load over that offset by said capacity weight mechanism, mechanism controlled by said weight responsive member for setting the fingers corresponding to the digits in the said excess weight, and means controlled by said capacity weight mechanism for setting a stop to position one of said fingers for recording the load offset by said capacity weight mechanism.

13. In weighing apparatus the combination comprising a beam, a poise slidable on said beam, a plurality of electrical contacts along the length of said beam, a contactor movable with said poise and adapted to engage one of said contacts in said beam when the poise is set, weight recording mechanism for printing the weight of the load offset by said poise and including a digit slide whose longitudinal position determines the digit to be printed, a series of electrically controlled stops adapted to be selectively placed in the path of said digit slide to set the latter, and electrical circuits including said contacts and selectively energized by the position of said poise for operating a stop to set said digit slide.

14. A scale of the character described comprising in combination a beam carrying a slidable poise for increasing the capacity of the scale, means for locating said poise on the beam, means clear of the poise for shifting said poise along the beam, weight recording mechanism including a digit slide controlling the printing of the digit representing the load offset by said poise, devices controlled by said shifting means and adapted to be engaged by said digit slide for setting the digit representing the load offset by said poise, and mechanism for holding the beam against movement during the shifting of the poise so as to avoid error in setting of said devices.

OTTO P. HAEGELE.
OLIN H. BASQUIN.